Aug. 7, 1956
H. D. KLINKER
2,757,470
ADVERTISING AND DISPLAY DEVICE
Filed Nov. 13, 1953
2 Sheets-Sheet 1
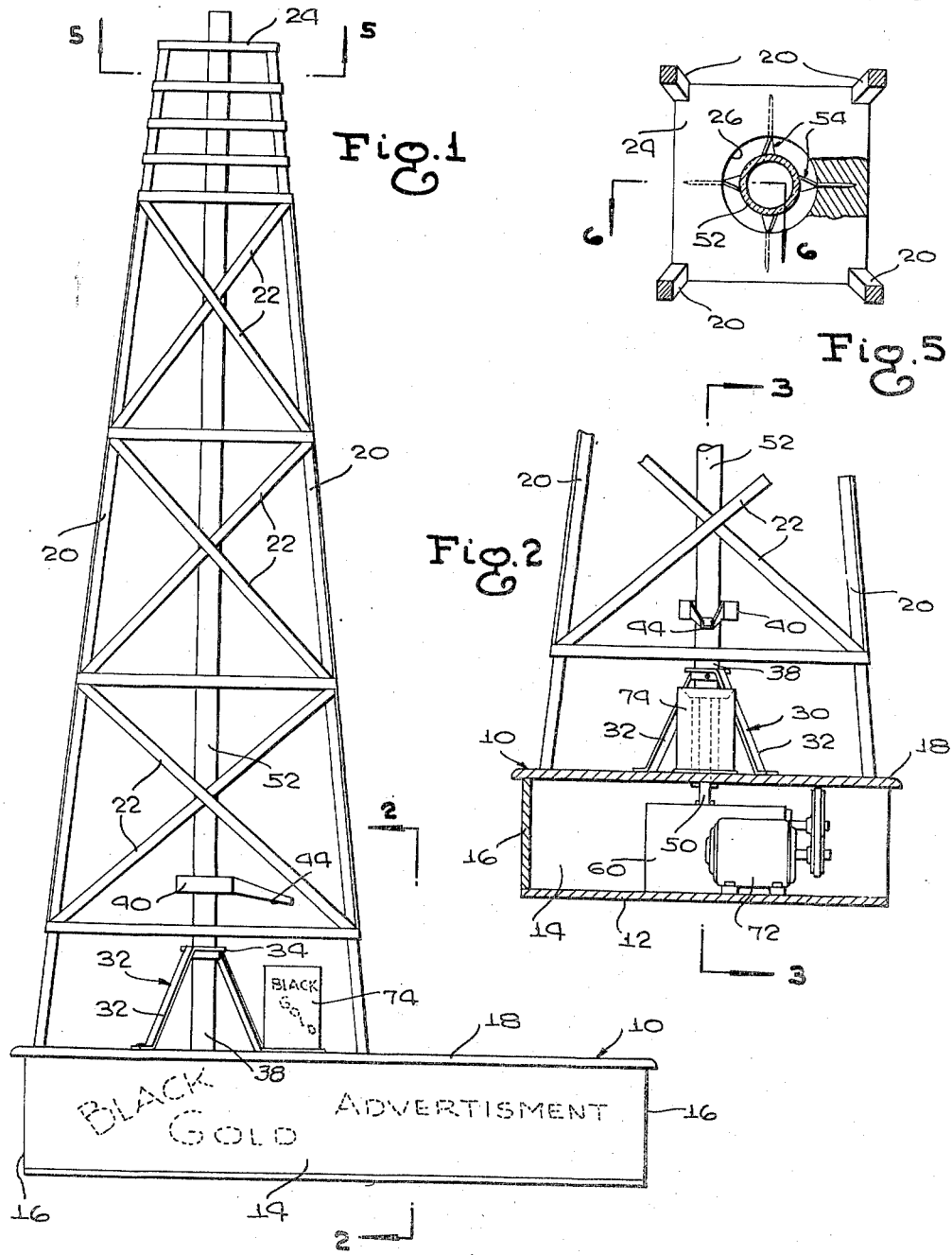
INVENTOR.
HENRY D. KLINKER
BY
McMorrow, Berman & Davidson
ATTORNEYS Aug. 7, 1956
H. D. KLINKER
2,757,470
ADVERTISING AND DISPLAY DEVICE
Filed Nov. 13, 1953
2 Sheets-Sheet 2
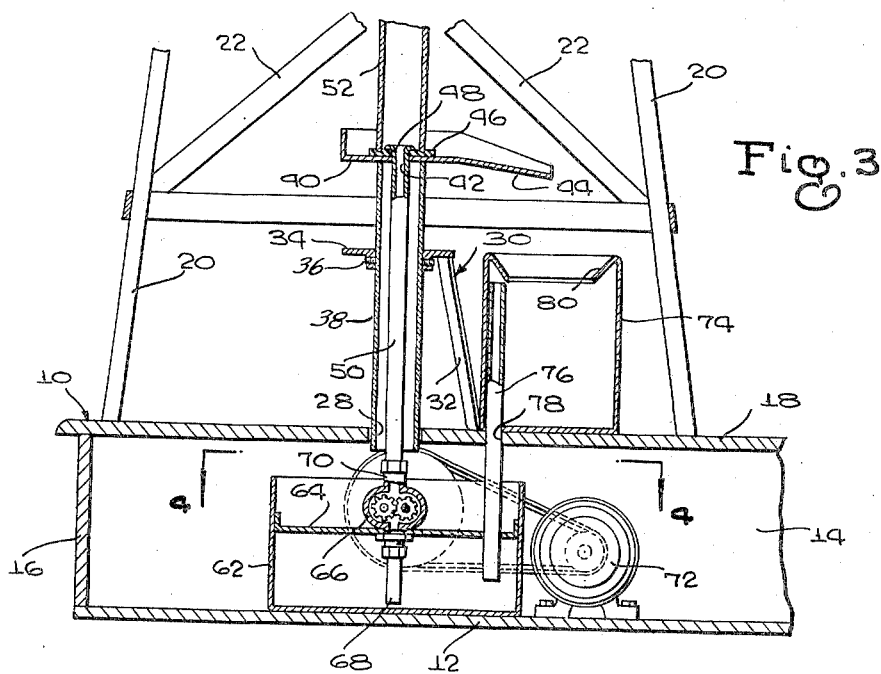
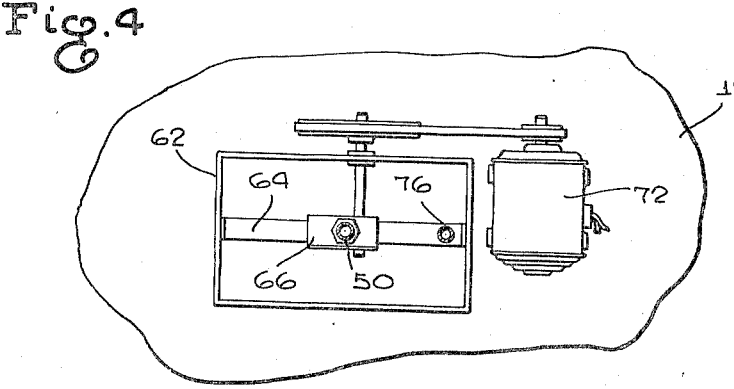
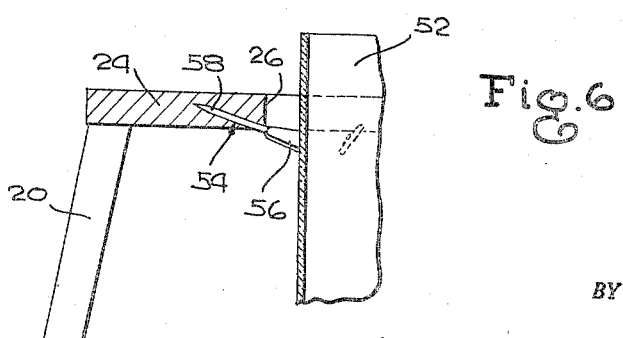
INVENTOR.
HENRY D. KLINKER
BY
McMorrow, Berman & Davidson
ATTORNEYS.

United States Patent Office 2,757,470
Patented Aug. 7, 1956

2,757,470
ADVERTISING AND DISPLAY DEVICE
Henry D. Klinker, Wheat Ridge, Colo.
Application November 13, 1953, Serial No. 391,949
2 Claims. (Cl. 40—126)

This invention relates to an advertising and display device and has for its primary object to call attention to an advertising message.

Another object is to simulate the flow of an oil well and the discharge of the oil into a receptacle bearing the advertising message.

A further object is to reproduce in miniature an oil well derrick with the display equipment associated therewith and in which the base of the device bears an advertising message.

The above and other objects may be attained by employing this invention which embodies among its features a pan, a discharge spout carried by the pan and extending outwardly and downwardly therefrom, a transparent tube carried by the pan and extending vertically upwardly therefrom, means carried by and extending through the pan before moving fluid upwardly into and through the tube to cause said fluid to envelop the tube and flow downwardly on the outside thereof into the pan and a receptacle located beneath the discharge spout and bearing on its exterior an advertising message.

Other features include a tubular column, a pan carried by the column and extending horizontally across the top thereof, said pan having an opening extending therethrough which opens into the interior of the column, a discharge spout carried by the pan and extending outwardly and downwardly therefrom, a tube of transparent material carried by the pan and extending vertically upwardly therefrom in axial alignment with the column, means mounted below the pan and extending through the opening for moving liquid upwardly into and through the tube to cause said liquid to flow over the top of the tube and downwardly thereabout to be intercepted by the pan and discharged therefrom through the discharge spout, and a receptacle mounted adjacent the column and beneath the discharge spout for receiving liquid discharged from said spout.

In the drawings:

Figure 1 is a side view in elevation of a display device embodying the features of this invention;

Figure 2 is a fragmentary sectional view taken substantially on the line 2—2 of Figure 1;

Figure 3 is an enlarged fragmentary sectional view taken substantially on the line 3—3 of Figure 2;

Figure 4 is a horizontal sectional view taken substantially on the line 4—4 of Figure 3;

Figure 5 is an enlarged horizontal sectional view taken substantially on the line 5—5 of Figure 1;

Figure 6 is a fragmentary enlarged sectional view through the upper end of the derrick taken substantially on the line 6—6 of Figure 5; and Figure 7 is a perspective view of one of the upper tube supports.

Referring to the drawings in detail, a bed or base designated generally 10 comprises a bottom 12, side walls 14 and end walls 16 forming a hollow box-like structure, the open upper side of which is closed by a top or cover 18. Carried by the cover and extending upwardly therefrom are converging legs 20 having cross braces 22 simulating the cross bracing of a conventional drill derrick. As illustrated, the legs 20 converge as they recede from the bed 10 and are provided adjacent their upper ends with a platform 24 having a relatively large opening 26 extending therethrough. Formed in the top 18 of the bed 10 in axial alignment with the opening 26 is an opening 28 which is of somewhat less diameter than the opening 26.

Mounted on the top 18 is a stand designated generally 30 which comprises upwardly converging legs 32 supporting adjacent their upper ends a flanged collar 34, the opening of which aligns axially with the openings 26 and 28 and clampingly supported in the flanged collar 34 as by set screws 36 is a tubular column 38, the lower end of which extends through the opening 28 and into the interior of the base or bed 10. A pan 40 is supported on the column and extends across the upper end thereof a relatively short distance above the base or bed 10, and this pan is provided with an opening 42 which aligns axially with the tubular column 36 and opening 28, and carried by the pan and extending downwardly and outwardly therefrom is a discharge spout 44. Seated on the upper surface of the pan is a suitable gasket 46 of a substantially soft pliable material and this gasket is provided with an axial opening 48 which aligns with the opening 42 for the reception of a discharge duct 50 which extends upwardly through the column 38 from the interior of the bed 10. Mounted on the gasket 46 and extending vertically upwardly on the pan 40 is a tube 52 preferably of a transparent material, the upper end of which projects upwardly through the opening 26, as will be readily understood upon reference to Figures 1 and 6. As illustrated in Figures 5 and 6, the opening 26 is of considerably greater diameter than the tube 52 and consequently I employ spacers designated generally 54, each of which comprises a relatively flat head 56, the side edges of which converge toward one end and carried by the convergent end of the head is a pointed shank 58 which, as illustrated, is adapted to be driven into the platform 24 so that the head projects outwardly to engage the tube 52. The end of the head remote from the shank is preferably curved as at 60 to conform to the curvature of the tube and the fastener is preferably inserted in the platform 24 so that the head tilts, as will be readily understood upon reference to the drawings.

Mounted within the bed or base 10 is a reservoir 62 and supported on a cross brace 64 within said reservoir is a pump 66 having an inlet nipple 68 disposed within the reservoir and a discharge nipple 70 directed upwardly in axial alignment with the opening 28. The discharge nipple 70 is coupled to the duct 50 so that when the pump is operated liquid contained in the reservoir will be directed upwardly through the intake nipple 68 and discharge nipple 70 to be conveyed through the duct 50 into the lower end of the tube 52. A suitable prime mover 72 is operatively connected with the pump to supply power for driving the pump and elevating the liquid.

Disposed beneath the discharge spout 44 and extending vertically upwardly from the top 18 of the bed 10 is a receptacle 74 in which liquid discharged by the discharge spout is received. A drain pipe 76 is carried by the receptacle 74 and extends downwardly through an opening 78 in the top or cover 18 into the reservoir 62 so that liquid deposited in the receptacle 74 will be drained into the reservoir 62. In the preferred form of the invention the upper end of the receptacle 74 is provided with an inwardly and downwardly extending flange 80 which conceals the upper end of the duct 76 which is disposed near the upper end of the receptacle 74. It will thus be seen that the receptacle 74 will remain substantially full of the liquid and as the level of the liquid rises therein, it will overflow into the upper end of the duct 76 to be conveyed to the reservoir 62.

In use, liquid such as oil is introduced into the reservoir 62 through the receptacle 74 and duct 76 to a selected level above the intake nipple 68 and upon operating the pump 66, the liquid will be pumped upwardly through the duct 50 into the tube 52 in which it will rise until it overflows the open upper end thereof to fall downwardly in enveloping relation with the tube until it is intercepted by the pan 40. As the liquid is intercepted by the pan 40, it will be discharged through the discharge spout 44 to be deposited thereby into the receptacle 74. Owing to the angular tilt of the fasteners 56, it will be obvious that no interruption to the flow of the liquid down the exterior of the tube will be experienced and any slight displacement of the liquid will be more or less hidden by the platform 24. Liquid impinging against the heads of the spacers will thus be deflected laterally, so as to be directed along a gently spiralling path as it flows downwardly along the tube 38. So long as the prime mover 72 is in operation, the liquid will be pumped upwardly through the tube 52 which being transparent will give the illusion of a column of oil which upon downward flow enters the pan 40 and discharge spout 44 to be received in the receptacle 74. In this way, an attractive display will be produced which will arrest passersby and bring to their attention an advertising message which may be printed on the receptacle 74 and also on the side or sides and ends of the bed or base 10.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. An advertising device for displaying a liquid in continuous flow comprising: a straight, vertical tube having its outer surface exposed over the full length of the tube, the tube having an inlet at its lower end and having its upper end formed open to provide an outlet; an upwardly opening pan mounted collar fashion about the lower end of the tube; a discharge spout laterally projecting from the pan to lead off liquid deposited in the pan; a receptacle spaced laterally of the tube and opening upwardly below and in spaced relation to the discharge spout to catch a liquid flowing out of the pan through the spout; a reservoir below the tube; a first conduit connected between the receptacle and reservoir for transferring liquid from the receptacle to the reservoir; a second conduit connected between the reservoir and inlet for transferring liquid from the reservoir to the lower end of the tube; and means in the second conduit for pumping liquid out of the reservoir through the second conduit and inlet into the tube, whereby to create a column of rising liquid within the tube overflowing the tube through the outlet to flow downwardly along the outer surface of the tube over the full circumference thereof into the pan.

2. An advertising device for displaying a liquid in continuous flow comprising: a base; a plurality of legs carried by and extending upwardly from the base; a platform mounted on the upper ends of the legs and having an opening; a straight, vertical tube extending upwardly from the base, the upper end of the tube projecting through said opening and being spaced from the edge of the opening to form an annular open space surrounding the tube at the location of the opening; a plurality of spacers secured to said platform and projecting radially of the tube into engagement with the exterior surface of the tube, across said annular space, each of said spacers including a shank embedded in the platform and a flat, approximately triangular head exposed within the annular space and inclined transversely out of a plane normal to the length of the tube, the tube having its exterior surface exposed over substantially the full length of the tube, the tube having an inlet at its lower end and havin its upper end formed open to provide an outlet; an upwardly opening pan secured collar fashion to the lower end of the tube; a discharge spout laterally projecting from the pan to lead off liquid deposited in the pan; a receptacle supported by the base laterally of the tube and opening upwardly below and in spaced relation to the discharge spout to catch a liquid flowing out of the pan through the spout; a reservoir in the base below the tube; a first conduit connected between the receptacle and reservoir for transferring liquid from the receptacle to the reservoir; a second conduit connected between the reservoir and inlet for transferring liquid from the reservoir to the lower end of the tube; and means in the second conduit for pumping liquid out of the reservoir through the second conduit and inlet into the tube, whereby to create a column of rising liquid within the tube overflowing the tube through the outlet to flow downwardly over the inclined heads of the spacers along the outer surface of the tube over the full tube circumference into the pan.

References Cited in the file of this patent

UNITED STATES PATENTS

| | | |
|---|---|---|
| 1,536,188 | Brown | May 5, 1925 |
| 1,847,129 | Miller | Mar. 1, 1932 |
| 1,992,000 | Carey | Feb. 19, 1935 |
| 2,045,898 | Cullison | June 30, 1936 |